United States Patent Office 2,730,767
Patented Jan. 17, 1956

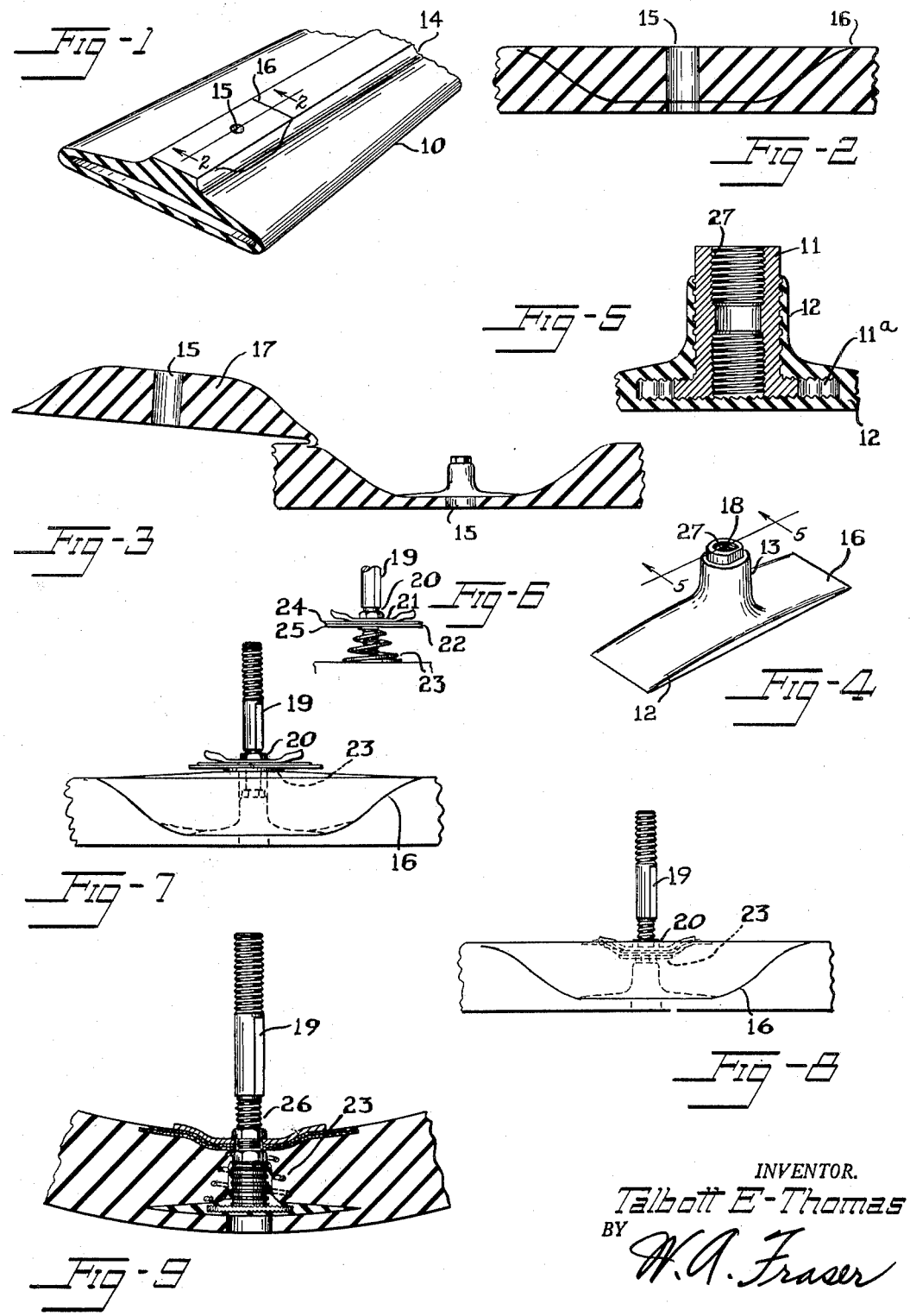

2,730,767

CURING BAG CONSTRUCTION

Talbott E. Thomas, Cuyahoga Falls, Ohio, assignor to The Firestone Tire & Rubber Company, Akron, Ohio, a corporation of Ohio Application April 15, 1953, Serial No. 348,891

4 Claims. (Cl. 18—45)

This invention relates to valved inflatable curing bags, and refers particularly to air, inert gases, water and steam bags for use in curing or vulcanizing pneumatic tires and to a method of producing same.

In vulcanizing pneumatic tires, inflatable formers, commonly referred to as curing bags, are generally used in providing the required internal pressure to force the tire against the tire mold. Such curing bags are expansible endless tubes composed of rubber, or rubber-like material, and are provided with metal inflation valve stems to facilitate the introduction of air, water or other suitable fluid under pressure. The valve stems are secured to the inner or base walls of the curing bags, extending through said walls and have means for attachment thereto, but considerable difficulty has been experienced in effecting a fluid-tight anchorage of the stem in or on the rubber which will continue to be fluid-tight through successive tire curing operations. In service, after a curing bag has been used in a tire curing operation, the bag is removed from the cured tire and used in the curing of another tire, and, in like manner, for as many additional tire cures as the condition of the curing bag will permit. Since curing bags are expensive and since a leaking bag may cause a defective tire, it is desirable to get the maximum number of cures from each bag and to overcome the causes of bag failures. One of the most common causes of failures of curing bags is leakage of the inflation fluid along and past the valve stem. This type of bag failure is known as a valve leak.

Two methods of combatting curing bag valve leaks have been resorted to in the art. One method depends upon obtaining a bond between the rubber and rubber-like material of which the body of a curing bag is composed and its metal, and the other method to mechanically drawing the base of a valve stem against the inside wall of the base portion of the bag body, thus obtaining a fluidtight seal. It is the former method with which the present invention is particularly concerned. Inserting or removing a curing bag from a tire results in extreme distortion of the bag walls; however, the metal valve stems are not distorted which results in the rubber or rubber-like material prematurely breaking its adhesion or bond to the metal. When a valve leak occurs, it may develop during the tire curing operation, in which event, it is often necessary to classify the tire as defective. A valve leak, in a curing bag, in which rubber adhesion to the valve stem is employed to prevent leaks usually results in scrapping the bag or at least in building into the bag a new valve stem to replace the old. Building in new stems is expensive and not entirely satisfactory since bags with replacement or built-in stems often fail before many additional cures have been obtained. Even so, curing bag constructions in which an adhesion between the rubber and metal valve stems are depended on to prevent leaks are generally more successful than mechanical valve stems.

The problem of obtaining adhesion between the rubber and the metal stems has been aggravated by the general use in the industry of butyl rubber in curing bags in place of natural rubber formerly used. Butyl rubber has a much longer life in curing bags than natural rubber, but butyl rubber has only a slight tendency to adhere to metal during vulcanization. Since butyl rubber will withstand many more vulcanizations without deteriorating than natural rubber, the solution of the problem of obtaining an improved fluid-tight adhesion between the body of a curing bag and its metal stem became increasingly important to and vigorously sought by the industry.

It is an object of the present invention to provide a method of making curing bags in which the rubber or rubber-like compound adjoining the metal valve stem is protected from distortion and thereby prevent valve leaks which otherwise would occur due to such distortion.

A specific object of the invention is to provide a means for embedding a sprial conical spring in the body of a curing bag about and spaced from the curing bag stem which embedment occurs automatically and concurrently with the molding and vulcanization of the curing bag.

Another object is to provide a curing bag having a wire spiral coiled spring disposed in spaced relation with and about a curing bag stem, the wire being sunk into the body of the bag while the rubber compound composing the body is plastic during vulcanization thereby avoiding the necessity of winding such wire about said valve before the valve is placed in the base of the bag and to further avoid a potential leak at the union of a valve plug of the prior art to said base of the bag.

Other objects will be apparent to those skilled in the art from the description of the invention, and by reference to the accompanying drawings, wherein:

Fig. 1 is a fragmentary perspective view partly in section of a curing bag as it appears in its extruded form before molding and vulcanization, but with a valve stem hole through the base thereof, and a knife cut illustrating two steps in the process of manufacture of a curing bag of the present invention;

Fig. 2 is a section taken on line 2—2 of Fig. 1;

Fig. 3 is a view illustrating the step of placing the valve stem plug shown in Fig. 4 in the base portion of the curing bag;

Fig. 4 is a perspective view of the valve stem plug shown in Fig. 3;

Fig. 5 is a sectional view of the valve stem plug taken on line 5—5 of Fig. 4;

Fig. 6 is a view in elevation illustrating the assembly of a valve stem extension, a lock nut, bridge washer, valve patch and a coil spring preparatory to the attachment of same to the valve plug disclosed in Fig. 4;

Fig. 7 is a fragmentary elevational view illustrating the assembly of Fig. 6 with the stem in threaded relation to the plug of Fig. 4, but before the valve stem and lock nut have been tightened down;

Fig. 8 is the same as Fig. 7, except the valve stem extension and associated elements have been tightened in relation with the valve plug, coil spring, valve patch and bridge washer shown just prior to laying the curing bag in its mold for vulcanization; and Fig. 9 is a fragmentary sectional view of a finished curing bag embodying the present invention illustrating the relative position of the valve parts and the coil spring, the coil spring having automatically embedded itself within the base portion of the curing bag during vulcanization.

Referring particularly to the drawings in which like parts are designated by like numerals of reference through the several views, Fig. 1 discloses a length of the curing bag referred to generally as 10, the same being shown in the section in which it is extruded from a conventional rubber extruder. In practice, the extrusion of the bag section is a continuous process, the extruded section being cut into approximately the proper lengths for the particular bags being manufactured. Later, these lengths are cut to the exact length required, a curing valve stem is inserted, the ends of the cut section are spliced together and the assembly laid in a curing mold and vulcanized into a full circle curing bag as will be understood by those familiar with the art.

Preparatory to inserting the curing stem, applicant provides a stem base portion 11 terminating in a plate-like flange 11a of a curing valve to which base rubber 12 has been attached and vulcanized in a mold to form a valve plug referred to generally as 13 of the molded shape illustrated in Fig. 4. The rubber of plug 13 is buffed and cemented preparatory to its application to the base 14 of the bag 10. The base 14 is prepared for reception of the plug 13 by first punching a valve hole 15 completely through the wall of the bag at the base and then making a knife cut 16 partially through the base, said cut extending the width of the base on the outside thereof inwardly on a slope at approximately a 45° angle and then longitudinally of the bag a distance sufficient to receive the base portion 16 of plug 13 and then outwardly on approximately a 45° angle to near the surface of the base where the cut terminates so as to leave a partially severed portion 17 of the base. It is noted that the portion 17, of base 14, is traversed by a portion of valve hole 15. Next, the portion 17 is turned back out of the way, but in hinged relation with the bag base, and the plug 13, having a valve stem passage 18 passing longitudinally therethrough, is placed at the bottom of the cut out base portion, as shown in Fig. 3, so that valve stem passage 18 is aligned with the portion of hole 15 which passes through the base of the valve below the cut 16. After the valve plug is in position, as just described, the turned back portion 17 is replaced so that the portion of the hole 15 therein is aligned with the passage 18 of the plug 13. It is to be understood that before the plug 13 is placed in the cut out portion of the base, the cut surface of the base may be buffed and cemented, if found desirable, all in accordance with the common practice in uniting rubber surfaces.

The assembly of Fig. 6 is now made preparatory to its application to the bag and this is done by first applying to a valve extension 19, best shown in Fig. 9, a lock nut 20, a plate-like bridge washer 21, valve patch 22, and a conical coil spring 23. In the specification and claims, the plug 13 and extension 19 when in threaded relation with each other will be referred to as the valve stem. The valve patch 22 comprises two layers 24 and 25 of square woven rubberized fabric, the patch 22 having an over-all length and width somewhat greater than the bridge washer 21. The assembly just described is applied to the bag base 14 by threading the thread end 26 (see Fig. 9) of the extension 19 into threaded relation with the internal threads 27 (see Fig. 4) in the passage 18 of the plug 13. It will be noted by reference to Fig. 7 that the lock nut 20 is in threaded relation with the top of threads 26. Preparatory to placing the bag in its mold, the lock nut 20 is tightened down against the washer forcing the washer 21 and valve patch 22 into the base 14 a distance sufficient to substantially bury these members in said base as illustrated in Fig. 8. It is to be noted at this point that when the lock nut 20 is tightened down as just explained, the coil spring 23 is compressed between the valve patch 22 and the surface of the bag base 14.

With the bag and the valve stem and their associated parts, assembled as illustrated in Figs. 7 and 8, the bag is ready to be laid in its mold, where it is molded and vulcanized in the usual manner, by introducing a bag inflating medium such as air, water or steam, fluid through the valve extension 19 and plug 13 in the usual manner of vulcanizing curing bags, all of which will be understood by those familiar with the art. As the rubbery material, of which the curing bag is composed, softens under the influence of the vulcanizing temperature, the compressed spring 23 slowly expands and embeds itself in the base portion of the bag about the plug 13 and spaced therefrom as illustrated in Fig. 9. As the coils of spring 23 sink into the bag base, the bag base material progressively closes about and closely surrounds the spring. It is to be noted that the rubbery material of the base immediately closes about the spring as it embeds itself and that no surface of the rubbery material adjoining the spring is permitted to remain exposed to the atmosphere whereby an ideal situation for union of the bag compound is created. Before the present invention, protective shields, which have been placed about and sometimes separated from the valve stem of curing bags, have always been disposed upon a surface that has been exposed for some time to the atmosphere. Exposure of the surface of rubber compounds to the atmosphere results in a phenomenon known as blooming, which is the migration of ingredients of the compound, such as sulphur, wax, oils, etc., to the surface. Such exposure resulted in the necessity of buffing and cementing of the surface, use of solvents and other expedients commonly used in the rubber industry in an effort to get a good union between rubber surfaces.

It will now be seen that applicant has provided a shield about the valve plug 13 and it is so embedded in the base of the bag that it avoids the problem of obtaining the satisfactory union between rubber surfaces that have been exposed to the atmosphere. It will also be seen that since the spring 23 automatically embeds itself in the bag base, such shielding of the valve stem is obtained with a substantial saving of labor over methods of installing such shields known to the prior art.

A detailed description of the particular embodiment of the invention illustrated and described herein is not to be construed as limiting the invention thereto. The invention includes all features of patentable novelty residing in the foregoing description and the accompanying drawing.

What is claimed is:

1. A molded curing bag of the character described comprising an extruded body portion of rubbery material, a valve stem and valve stem shield molded into said body portion, said shield being in the form of a conical coiled wire and being disposed about and spaced from said stem in said body portion, said shield being entirely embedded in said rubbery material with that portion of said material which is in contact with the shield being free of any effects of exposure to the atmosphere or foreign material during the interim between the extrusion of said body portion and the finished bag.

2. The method of making curing bags of the character described comprising the steps of extruding a continuous length of rubbery material of proper section to form the hollow body portion of the bag, cutting a predetermined length from said continuous length, punching a valve hole through the wall of the cut-off body portion, cutting out a portion of said wall at said valve hole by cutting partially through said wall across said valve hole, removing said cut-out wall portion forming a recess in said wall adapted to receive a valve plug, placing a valve plug having an axial passage therethrough in said recess with the said passage communicating with the valve hole at the bottom of said cut-out, replacing said cut-out portion by pressing it over the valve plug with the plug extending into the valve hole in said cut-out portion, placing a nut, a washer, a rubberized patch and a conically shaped coiled spring on a valve extension, said extension having a threaded end to receive said nut and an axial passage, attaching said extension to said plug with the passages through the plug and extension in communication and with said spring, patch and washer interposed between said nut and the bag body with the base of the spring in contact with said body and the washer adjacent the nut, tightening said nut to forcibly compress said spring between the bag body and the patch, splicing the ends of the cut-off length and molding and vulcanizing the bag in a curing mold having a mold opening conforming in shape to the exterior contour desired for the finished bag, automatically embedding said spring in the wall of the bag about said valve stem and spaced therefrom by the force the compressed spring exerts on the rubbery body material when said material becomes soft during said vulcanizing step.

3. The method of making curing bags of the type having a body wall of rubbery material and a valve stem incorporated in said wall for the passage of fluid therethrough, which stem is surrounded in said wall by a conical coiled spring in spaced relation to the stem, comprising the steps of placing said coiled spring about a portion of said stem that projects out of the bag body with the spring in direct contact with said wall, compressing said spring between said wall and a valve washer on said stem, laying the bag in a mold and molding and vulcanizing said body portion, whereby the rubbery material becomes soft and the compressed spring expands and automatically embeds itself within the said wall about said stem.

4. The method of making curing bags of the character described comprising the steps of extruding a continuous length of rubbery material of proper section to form the hollow body portion of the bag, cutting a predetermined length from said continuous length, punching a valve hole through the wall of the cut-off body portion, placing a valve stem in said valve hole and a nut, a washer, a rubberized patch and a conically shaped coiled spring on said valve stem, with said spring, patch and washer interposed between said nut and the bag body with the base of the spring in contact with said body and the washer adjacent the nut, tightening said nut to forcibly compress said spring between the bag body and the patch, splicing the ends of the cut-off length and molding and vulcanizing the bag in a curing mold having a mold opening conforming in shape to the exterior contour desired for the finished bag, automatically embedding said spring in the wall of the bag about said valve stem and spaced therefrom by the force the compressed spring exerts on the rubbery body material when said material becomes soft during said vulcanizing step.

References Cited in the file of this patent
UNITED STATES PATENTS

| | | |
|---|---|---|
| 1,553,154 | Gammeter | Sept. 8, 1925 |
| 1,952,427 | Evans | Mar. 27, 1934 |
| 2,119,623 | Goff | June 7, 1938 |
| 2,218,639 | Crowley | Oct. 22, 1940 |
| 2,568,848 | Enabnit | Sept. 25, 1951 |